H. W. RICHDALE.
SOLDERING APPLIANCE.
APPLICATION FILED SEPT. 9, 1914.
1,169,103.
Patented Jan. 18, 1916.
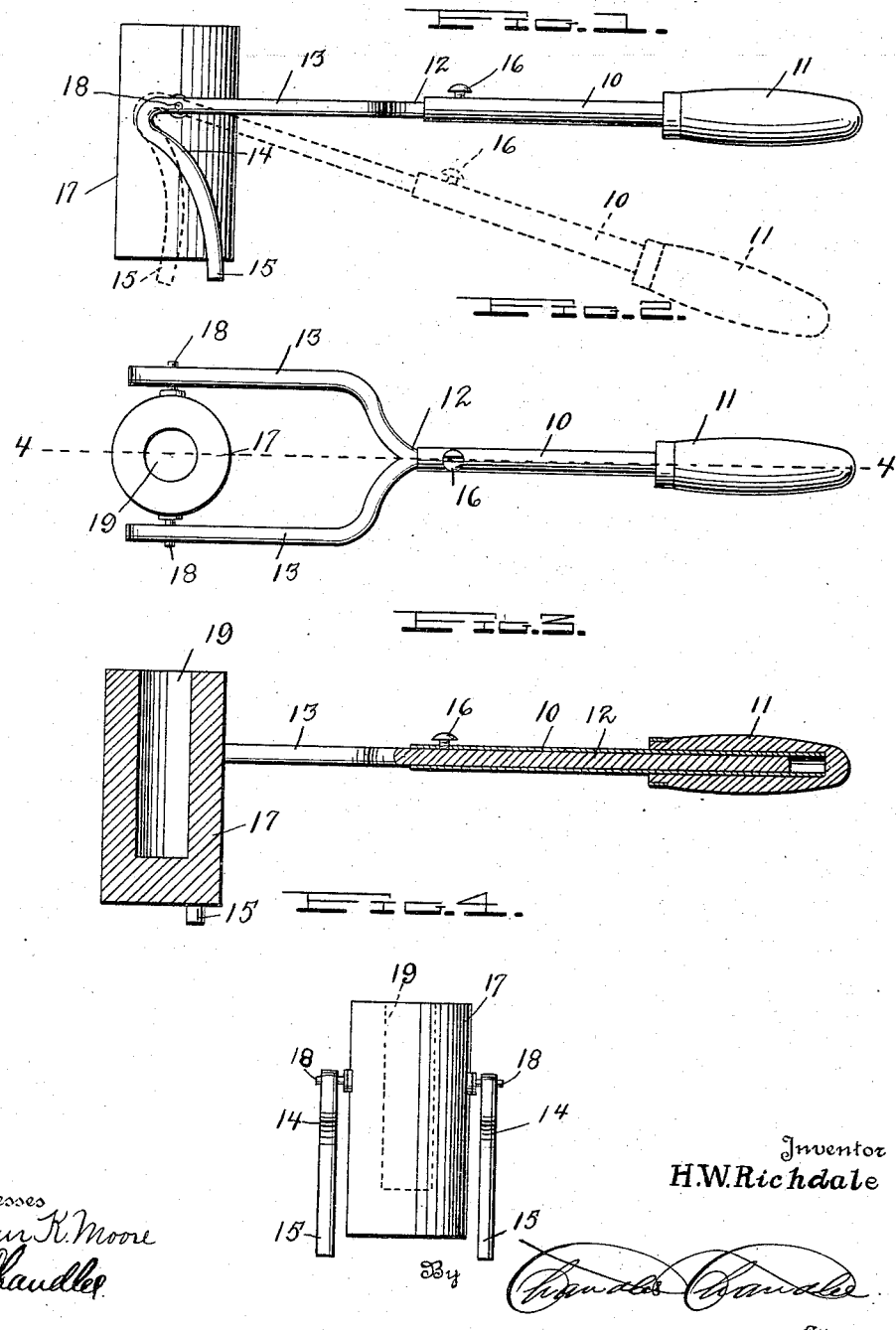
Inventor
H. W. Richdale

UNITED STATES PATENT OFFICE.

HERBERT W. RICHDALE, OF CANNON STATION, CONNECTICUT, ASSIGNOR OF ONE-THIRD TO AMMON S. GREEN AND ONE-THIRD TO HOWARD E. CABLE, OF WESTPORT, CONNECTICUT.

SOLDERING APPLIANCE.

1,169,103.  Specification of Letters Patent.  Patented Jan. 18, 1916.

Application filed September 9, 1914. Serial No. 860,861.

*To all whom it may concern:*

Be it known that I, HERBERT W. RICHDALE, a citizen of the United States, residing at Cannon Station, in the county of Fairfield, State of Connecticut, have invented certain new and useful Improvements in Soldering Appliances; and I do hereby declare the following to be a full, clear, and exact description of the invention, such as will enable others skilled in the art to which it appertains to make and use the same.

This invention relates to improvements in soldering appliances and more particularly to a device especially designed for use in soldering spliced terminals of wires or the like.

An object of the invention resides in the provision of a soldering appliance in which the body thereof is in the form of a metal container, solder being placed therein and retained in a liquid state whereby the terminals of a number of splices may be soldered with one heating of the container.

A further object of the invention is to provide a container of the character referred to which is mounted for pivotal movement eccentrically of the handle, so that no matter at what angle the handle is held, the container will at all times be supported in a substantially perpendicular position.

With the above and other objects of similar nature in view, the invention consists in the construction, combination and arrangement of parts, set forth in and falling within the scope of the appended claim.

In the drawings: Figure 1 is a side elevation of a soldering appliance constructed in accordance with the invention, Fig. 2 is a plan view thereof, Fig. 3 is a longitudinal sectional view, and Fig. 4 is a transverse sectional view taken on the line 4—4 of Fig. 2.

Referring now more particularly to the drawing, the device comprises a tubular handle member 10 having fixed on one end thereof a suitable hand grip 11. Slidably engaged in this tubular member is an extension rod 12 which terminates at its forward end in a pair of forked arms 13, the extremities of said arms being curved rearwardly and downwardly as at 14 whereby a pair of supporting legs 15 will be provided. For adjusting the rod 12 to different lengths the same is moved into and out of the tubular member 10 and retained in such adjusted position by means of a set screw 16 carried at the forward end of the tube. Mounted for swinging movement between the arms 13, is the cylindrical member 17 which is in the form of a copper casting having trunnions 18 extending radially therefrom at diametrically opposite points and pivotally engaged in transversely alined openings formed in said arms. These trunnions 18 are disposed adjacent one end of the cylinder and provide an eccentric mounting therefor, such mounting insuring a perpendicular position of the iron no matter at what angle the handle of the device is held.

In casting the member 17 there is formed therein a longitudinal recess 19 which extends from the upper end and terminates at a point short of the lower end, a suitable container being thus provided for the reception of lead solder or similar substance in a molten state.

When employing the device, the recess 19 is filled with solder and the container 17 heated in the usual manner, the desired amount of flux being mixed with the solder, so as to obviate the pasting of the joints as is usually the case. When the member 17 has become sufficiently heated to melt the solder contained therein, and the handle adjusted to the desired length, the device is carried by means of the grip 11 and the terminals of the wires to be soldered inserted within the recess 19, said terminals being thus coated over their entire surface whereby a perfectly smooth and even joint will result. This operation may be repeated with a number of splices before it becomes necessary to again heat the container.

It will be apparent from the above description that the device may be employed for soldering spliced terminals of wire or the like, which are in such locations as would ordinarily render the task extremely difficult and laborious. By reason of the adjustability of the handle and the novel manner of mounting the container, joints disposed above and below or at an angle to the common plane of work may be readily soldered with a minimum expenditure of time and labor.

If for any reason it be desired to leave the device while still in a heated state, the same may be supported upon the legs 15, the container thus retaining its normal or perpendicular position and danger of spilling the contents thereof or injuring the support on which the device is placed, entirely obviated.

What is claimed is:

A soldering appliance comprising a handle having one end bifurcated to form spaced arms, a soldering container eccentrically pivoted between the arms whereby same will assume a substantially perpendicular position at all times, and legs on said arms respectively, said legs coöperating with the end of the handle remote from the container to support the latter in elevation.

In testimony whereof, I affix my signature, in the presence of two witnesses.

HERBERT W. RICHDALE.

Witnesses:
 Mrs. JOHN P. RICHDALE,
 L. E. C. MOORE.

Copies of this patent may be obtained for five cents each, by addressing the "Commissioner of Patents, Washington, D. C."